Oct. 23, 1923.

S. R. LAMB 1,471,341

TIME CALCULATOR

Filed June 6, 1919

Inventor
Sidney R. Lamb
By his Attorney

Oct. 23, 1923.

S. R. LAMB 1,471,341

TIME CALCULATOR

Filed June 6, 1919

Inventor
Sidney R. Lamb
By his Attorney
Arthur L. Kent

Patented Oct. 23, 1923.

1,471,341

UNITED STATES PATENT OFFICE.

SIDNEY R. LAMB, OF NEW YORK, N. Y.

TIME CALCULATOR.

Application filed June 6, 1919. Serial No. 302,135.

*To all whom it may concern:*

Be it known that I, SIDNEY R. LAMB, a citizen of the United States, residing at New York city, in the county of New York and State of New York, have invented certain new and useful Improvements in Time Calculators, fully described and represented in the following specification and the accompanying drawings, forming a part of the same.

My invention relates to a calculator especially adaptable for computing working time simply, quickly and accurately.

An object of the invention is to provide a very simple instrument for the indicated purpose. Another object is to make special provision for computing the time with a fixed deduction from the total time effected automatically by the instrument. A further object is to make the instrument adjustable to vary the amount of time deducted. A further object is to provide simple and effective means for computing overtime. A further object is to provide simple and effective stop devices to aid in resetting the instrument or in bringing the movable dial to a desired point in making calculations. A further object is to provide a double or reversible instrument in which, for instance, a device for calculating ordinary time or time with a deduction is arranged on one side of the instrument, and a device for indicating overtime is arranged on the other side.

The foregoing and other objects, advantages and characteristics of the invention are sufficiently pointed out hereinafter in connection with a detailed explanation of the accompanying drawings which show one exemplifying embodiment of the invention.
After considering this, persons skilled in the art will understand how variations may be made in structure and arrangement without departing from the principles of the invention.

Fig. 1 is a top plan of a calculating instrument embodying the invention.

Figure 1:
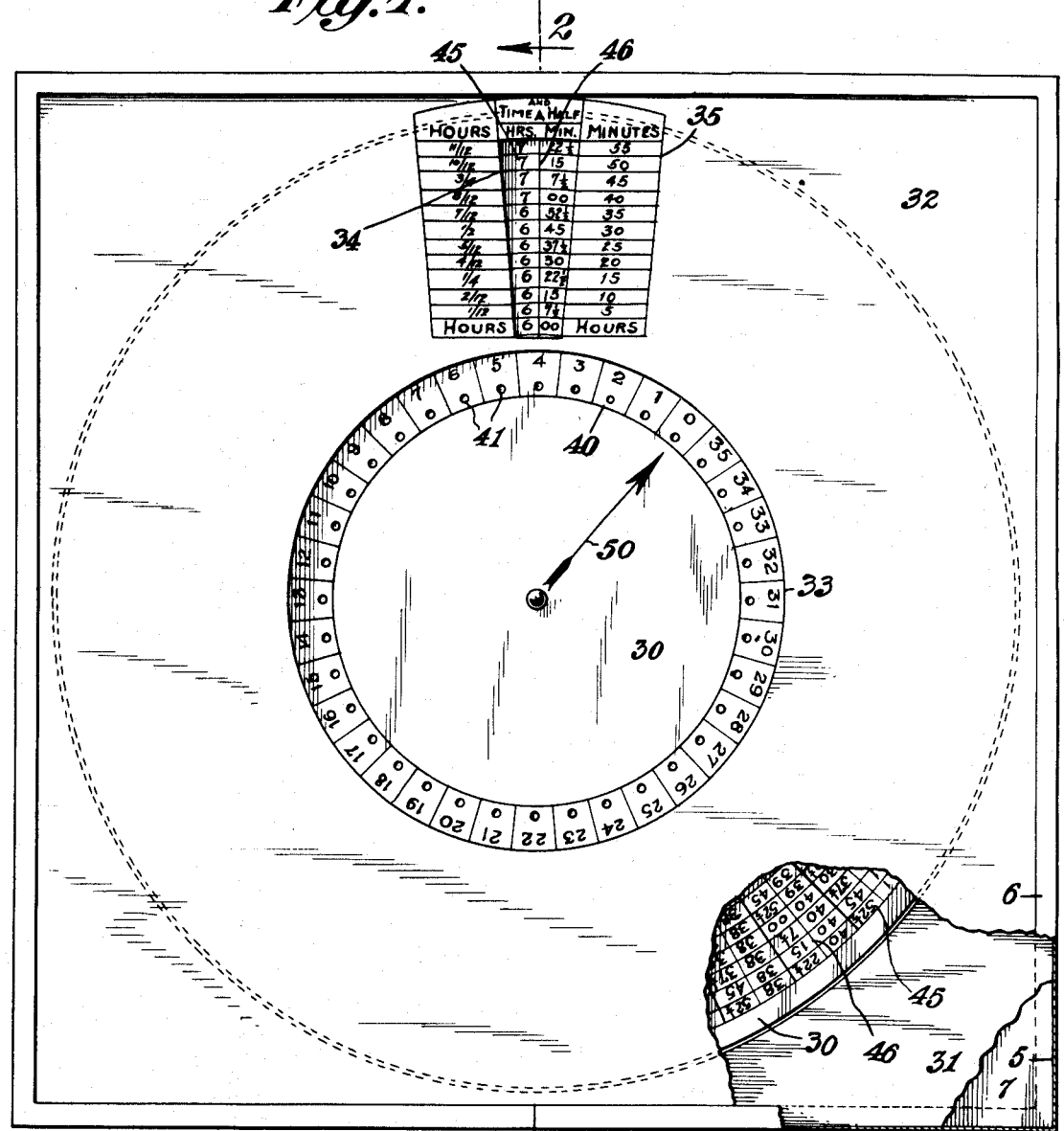
Figure 2:
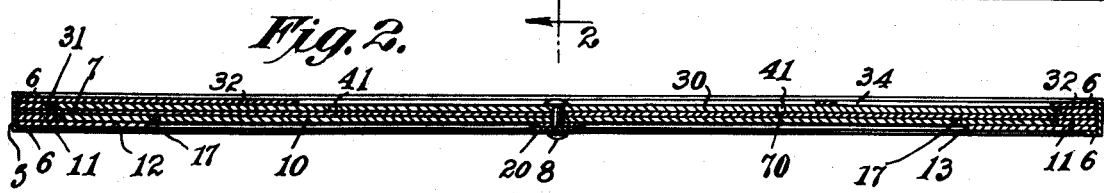
Fig. 2 is a section on the line 2—2 of Fig. 1.
Figure 3:
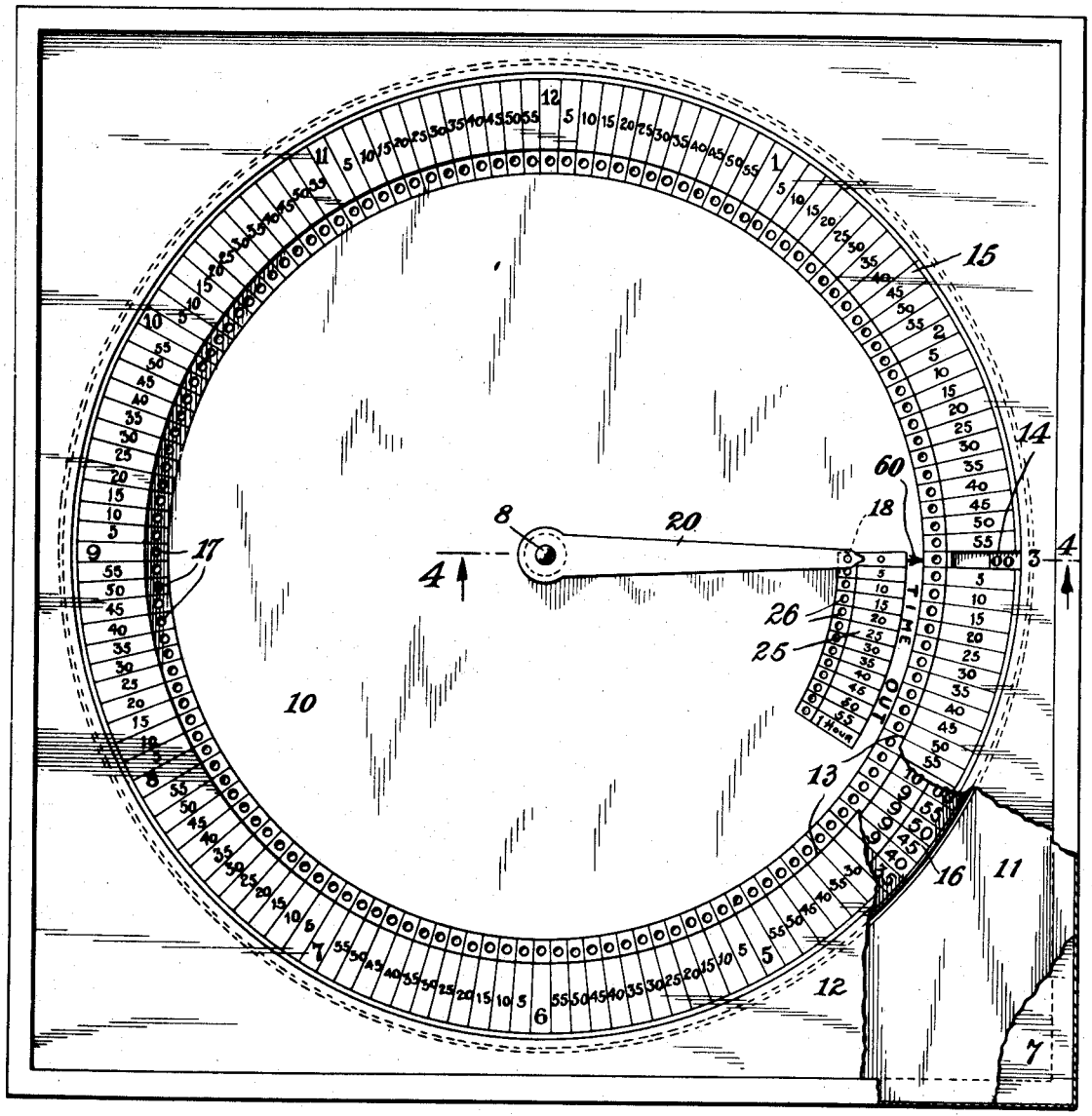
Fig. 3 is a bottom plan view.
Figure 4:
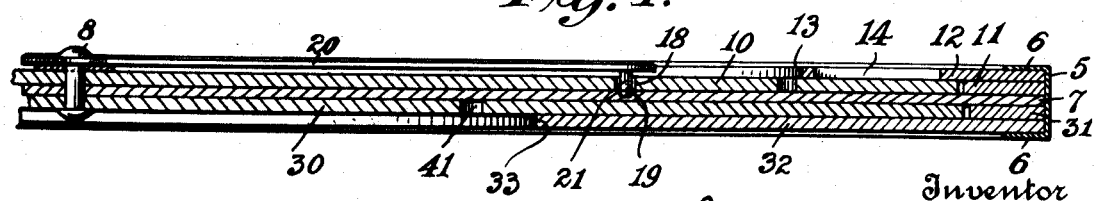

Fig. 4 is an enlarged partial section on line 4—4 of Fig. 3.

The parts of the structure are secured in a housing or box 5 which has top and bottom inwardly extending flanges 6. Centrally located in the housing is a partition or plate
7. A pivot 8, which may be as shown in the form of a rivet, passes through the center of the plate and extends at both sides of it. This pivot serves as a bearing for the movable discs and in some cases for a pointer or movable stud, as later explained.

At one side of the center partition 7 is a movable disc 10 having a center bearing on the pivot 8 and having its circular periphery located close to the circular inner periphery of a filler piece 11 of substantially the same or slightly greater thickness than the disc 10. The filler piece fits within and is held irrevolubly by the casing. Overlying the filler piece and the outer part of disc 10 is a top plate 12 which carries a fixed scale or index which has a hole cut in it forming a circular inner edge 13 concentric with pivot 8. In the top plate is an aperture or window 14 giving a restricted view of the movable disc 10. About the opening in top plate 12 is a circular index or scale 15 equally divided, and the divisions are marked to indicate hours from one to twelve and fractions of each hour, the fractions being indicated in this example as five minute intervals. The window 14 takes the place of one of the scale spaces, and conveniently this may be the space corresponding to the third hour designation, Figure 3 indicating the third hour being placed just outside the scale. The window may be located at any other place in the scale.

The movable disc carries an index or scale 16 divided and numbered similarly to scale 15, but arranged in reverse order as to the direction of ascending numerical values. The disc is in such a position in Fig. 3 that zero of its scale appears in the window. At any time that the movable disc is set so that its zero appears at a predetermined point with relation to the top plate, this point being in the present instance the window 14, if a point on the disc opposite a division on scale 15 at which the time calculation is to commence is noted and the scale is revolved to bring this point opposite a scale division indicating the stopping point of the calculation, a numerical indication of the elapsed time appears at the designated point on the top plate—in this case at window 14. For instance, if a work period commences at 9 o'clock and ends at 12 o'clock, a point on disc 10 opposite Figure 9 of scale 15 is noted and the disc is revolved until the point is oposite number 12 of the scale, whereupon a Figure 3, indicating three hours elapsed time, will appear in the window 14 on the left of the division line on scale 16. The use of the calculator and its indicating action with respect to fractions of hours will be evident from an inspection of the drawing.

To facilitate the operation of the calculator, preferably a series of small holes 17 are provided in disc 10 near edge 13 of the top plate, these holes being of a size to conveniently fit the point of a pencil or stylus which is inserted in the hole opposite the number on scale 15 at which the calculation is to commence. The point of the pencil or stylus rests on center plate 7, and disc 10 may thus be easily revolved until the point is opposite the number indicating the end of the time period.

The movable disc is, of course, to be moved back to zero position after every calculation, and to facilitate this adjustment of the disc special means are preferably provided. In the present embodiment, a hole 18 of a size similar to holes 17 is provided in disc 10, and a depression 19 with bevelled or sloping sides is provided in the center plate 7, hole 18 being opposite the zero designation of scale 16, and depression 19 being opposite window 14 of the top plate. A stylus inserted in hole 18 will run smoothly on the surface of plate 7 until depression 19 is encountered, and by the entry of the stylus into the depression the disc is stopped at the proper zero point. Instead of requiring that a stylus be used in connecteion with hole 18 and depression 19, a special device for indicating zero position to cooperate with the hole and depression may be provided. In the present embodiment this consists of a movable arm or pointer 20 centered movably on the pivot 8 and carrying a stud or pin 21 adapted to pass through hole 18 and engage the depression 19. When the pin is in hole 18, the disc may be reset by engaging the stylus with any of the holes 17. In the rotation of the disc by this means, zero point is indicated by entry of the end of pin 21 into depression 19. Owing to the sloping sides of the depression, the pin is forced out of it without difficulty whenever the disc is revolved to make a calculation.

Where there are two work periods in one day with an interval, the total time may be calculated by inserting the stylus in hole 17 opposite the number indicating the beginning of the first period and moving the stylus to a point opposite the number indicating the end of the first period; then inserting the stylus in the hole opposite the number indicating the beginning of the second period and moving it until it is opposite the number indicating the end of the second period. The indication at the window 14 will then be the total working time. But in many cases it is desirable to provide means for automatically deducting from the elapsed time a certain interval and also to make this deduction variable within reasonable limits. In the present embodiment a scale or index 25 is provided on disc 10, and this may be at any convenient place. The scale is divided into parts indicating one hour and fractions of an hour in twelfths, and opposite each division number is a hole 26. In the present arrangement hole 18 constitutes the one of the series of holes 26 opposite zero of the deduction scale which is also in the present example opposite zero of the scale 16. Stud 21 of pointer 20 is arranged to cooperate with holes 26 in the same manner as described above with reference to hole 18, and by entering socket 19 to stop disc 10 at an adjustable point in relation to the fixed scale 15, depending on which one of the holes 26 is entered by pin 21. The adjustment of the pin in relation to holes 18 and 26 thus sets the device for making a fixed deduction of time from a number of successive calculations. For instance, in the setting shown in Fig. 3, there is no deduction and the operation of the device may be as above described for one or more work periods, deductions being observed and accounted for in the positioning of the stylus. If a deduction of fifteen minutes is to be made for a pause of that length between two work periods, pin 21 is removed from hole 18 and inserted in hole 26 opposite the number 15 of scale 25. Rotation of disc 10 until the end of pin 21 enters depression 19 then locates the disc in its starting position corresponding to fifteen minutes time deduction, but in this case, of course, zero of scale 16 will not appear at window 14, but in the described readjusted position of disc 10 the numeral 55 between the hour numerals 11 and zero (corresponding also to 12) of scale 16 will appear at the window. The initial indication of the scale is of no consequence. If there are two work periods with the designated interval the calculation is made by inserting the stylus in hole 17 opposite the number on scale 15 indicating the beginning of the first period, and the stylus is moved to a point opposite the number indicating the end of the second period, and thereupon the number appearing at window 14 will indicate the total elapsed hours and minutes less the indicated deduction. It will be evident that scale 25 may be extended to provide for a greater number of different deductions if desired.

When it is not desired to use pointer 20 and its pin 21 for any of the purposes described, the pointer may be moved away from the scale and the pin allowed to rest on the surface of disc 10. A stylus may then be used in any of the holes 18 or 26, and will cooperate with depression 19 for the purposes above described. Evidently, also if desired a depression similar to 19 may be provided in plate 7 beneath the series of holes 17 opposite a concealed point of the fixed scale—usually at the zero point, or opposite window 14. This will cooperate with a stylus inserted in the hole 17 opposite the zero designation of scale 16, and for that purpose the hole may be indicated by a mark such as arrow 60. This is especially desirable if there is no other visible indication of the zero point of scale 16, such as is afforded for example in the present embodiment by the zero indication of scale 25.

Means for calculating overtime are conveniently arranged in the other side of the casing. At the opposite side of center plate 7 is a rotatable disc 30 centered on pivot 8 and having its circular periphery located in a circular hole in a filler piece 31 similar to filler piece 11. Superposed on disc 30 and filler piece 31 is a cover plate 32, the edges of which are located under flange 6. Cover plate 32 is provided with a central hole defined by its inner edge 33. In a suitable place in the cover plate is provided a window 34. Adjacent to the window is a scale 35 divided and numbered to indicate fractions of an hour. For convenience, fractions indicating parts of an hour are arranged at one side of the window, and numbers indicating the number of minutes in twelfth parts of an hour are arranged at the other side. The words "hours" in the bottom divisions of the scale indicate even hours without fractions, as explained hereafter. At the top of the scale may also appear the legend "time and a half" to call attention to the fact that indications given are of overtime work.

Disc 30 bears a scale 40 arranged inwardly of but near inner edge 33 of cover plate 32. This scale is divided into equal parts by radial lines, and each part is serially numbered from zero to 35, indicating hours of actual working time. In each division of scale 40 is provided a hole 41 for the convenient manipulation of the disc in a manner substantially similar to that previously described in connection with the elapsed time calculating means.

Disc 10 also bears a scale 45 radially coextensive with window 34 and otherwise concealed by the cover plate 32. This scale has main radial divisions corresponding to the divisions of scale 40, and each of these main divisions is centrally divided by radial line 46 into two parts. The scale is also divided by concentric circles. The numbering of scale 45 can best be understood from a particular example. When the overtime rate is time and a half, as in the present case, the numbering of the main division of scale 45 corresponding to the section of scale 40 in which the number 4, indicating four hours of actual time, appears, is as follows:—
In the innermost space of scale 45 at the left of division line 46 is the number 6, indicating six hours overtime, corresponding to the four hours actual time, and in the space at the right of the division line appears two zeros, indicating no fraction. This numeral 6 appears opposite the words "hours" of scale 35, showing that the indication is of the even number of hours corresponding to the hour designation of the part of scale 40, which is at that time opposite the window. In the next outward space of this section of scale 45 at the left of the division line is the number 6, and at the right of the division line is the number 7-1/2, indicating six hours, seven and one-half minutes of overtime; and this designation appears opposite the fraction 1/12 and the minute number 5 of scale 35, indicating that six hours, seven and one-half minutes is the amount of overtime corresponding to four hours and five minutes of actual time. The numbering of successively outward divisions of this section of scale 45 is arranged in an obvious way to show overtime for successive additions of fractions of an hour, as indicated by scale 35, to the even number of hours indicated by scale 40. The numbering of other sections of scale 45 corresponding to other sections of scale 40 is arranged on the same principle to indicate by comparison with scale 35 the number of hours and minutes of overtime corresponding to the hours of actual time of the different divisions of scale 40 plus any fraction of an hour of actual time indicated by scale 35.

No resetting of disc 30 is necessary. In its operation the stylus is simply inserted in the hole 41 corresponding to the number of even hours of actual time and moved until it is opposite the window, and then the overtime is read from scale 45 for an even number of actual hours, or for that number plus a fraction, as indicated by scale 35. An arrow 50 or other marker may be placed on disc 30 to indicate the zero section of scale 40, this being mainly to assist the user in quickly locating the hour division of the scale desired.

Evidently, the numbering of scale 45 may be changed to correspond to any desired overtime ratio.

A stop depression or detent 70 similar to detent 19 previously described may be provided for disc 30, and this is preferably located as shown opposite the middle of the window. This assists in accurately centering opposite the window any division of the concealed scale corresponding to the hole in which the stylus is inserted to position the disc.

What is claimed is:

1. In a calculating appliance, the combination of a fixed scale, a movable member bearing a scale and also provided with a perforation, a device adjustable on the movable member and provided with a pin adapted to pass through the perforation and extend below it, and a member beneath said movable member having a bearing surface engaged by the end of the pin and also having a depression adapted to be entered by the end of the pin to assist in stopping the movable member at a predetermined point.

2. In a calculating appliance, the combination of a fixed scale, a movable member bearing a scale and also provided with a series of perforations, a device adjustable on the movable member and provided with a pin adapted to pass through the perforations selectively and extend below them, and a member beneath said movable member having a bearing surface engaged by the end of the pin and also having a depression adapted to be entered by the end of the pin to assist in stopping the movable member at a selectively determined point.

3. In a calculator, the combination of a fixed scale, a movable scale, and means movable with respect to the moving scale in the same direction as its movement in relation to the fixed scale and cooperating with the movable scale to make automatic deductions from the comparative indication of the fixed and movable scales.

4. In a calculator, the combination of a fixed scale, a movable scale, and adjustable means movable with respect to the moving scale in the same direction as its movement in relation to the fixed scale and cooperating with the movable scale to make automatic variable deductions from the comparative indication of the fixed and movable scales.

5. In a calculator, the combination of an outer plate having an aperture, a scale arranged about the aperture, the plate being provided with a window, a rotatable member having a scale the designations of which are visible singly through said window, the rest of them being concealed by the outer plate, the rotatable member being provided with perforations opposite the divisions of its scale and near the fixed scale, a deduction scale carried by the rotatable member, said member being provided with perforations corresponding to the divisions of the deduction scale, and a member below the rotatable member having a depression adapted to be engaged by an implement extending through one of said perforations to aid in setting the movable member at a predetermined point.

6. In a calculator, the combination of an outer plate having an aperture, a scale arranged about the aperture, the plate being provided with a window, a rotatable member having a scale the designations of which are visible singly through said window, the rest of them being concealed by the outer plate, the rotatable member being provided with perforations opposite the divisions of its scale and near the fixed scale, a deduction scale carried by the rotatable member, said member being provided with perforations corresponding to the divisions of the deduction scale, a member below the rotatable member having a depression adapted to be engaged by an implement extending through one of said perforations to aid in setting the movable member at a predetermined point, and an adjustable device on the rotatable member carrying a pin adapted to extend through certain of said perforations and engage said depression.

7. In a calculator, the combination of a fixed member having a window and a scale bearing overtime designations adjacent to the window, and a movable member having an exposed scale indicating hours of actual time, and a concealed scale, sections of which are exposed through said window, the concealed scale having designations indicating overtime corresponding to hours of the exposed movable scale and fractions of hours of the fixed scale.

8. In a calculator, the combination of a fixed member having a window and a scale bearing overtime designations adjacent to the window, and a movable member having an exposed scale indicating hours of actual time, and a concealed scale, sections of which are exposed through said window, the concealed scale having designations indicating overtime corresponding to hours of the exposed movable scale and fractions of hours of the fixed scale, the movable member being provided with perforations opposite sections of the exposed movable scale to receive a stylus point.

In testimony whereof I have hereunto set my hand in the presence of two subscribing witnesses.

SIDNEY R. LAMB.

Witnesses:
ADELE S. EBERHARDT,
D. W. SMITH.